United States Patent [19]

Ueda et al.

[11] Patent Number: 4,853,972
[45] Date of Patent: Aug. 1, 1989

[54] RADIO TRANSCEIVER INCLUDING AN ANTENNA SWITCHING CIRCUIT CAPABLE OF CHANGING RECEPTION SENSITIVITY

[75] Inventors: Hideki Ueda; Sotoaki Babano, both of Tokyo, Japan

[73] Assignee: NEC Corporation, Tokyo, Japan

[21] Appl. No.: 35,321

[22] Filed: Apr. 7, 1987

[30] Foreign Application Priority Data

Apr. 9, 1986 [JP] Japan .................... 61-80138

[51] Int. Cl.⁴ .................... H04B 1/44; H04B 1/38
[52] U.S. Cl. .................... 455/83; 455/82; 455/78; 455/254
[58] Field of Search .................... 455/78, 79, 82, 83, 455/195, 254; 370/32

[56] References Cited

U.S. PATENT DOCUMENTS

| | | | |
|---|---|---|---|
| 3,117,241 | 1/1964 | Paynter et al. | 455/82 |
| 3,452,299 | 6/1969 | Angel | 455/83 |
| 3,891,947 | 6/1975 | Debost et al. | 455/83 |
| 4,055,807 | 10/1977 | Priniski et al. | 455/83 |
| 4,170,756 | 10/1979 | Sheppard | 455/82 |
| 4,186,350 | 1/1980 | Takayama | 455/195 |
| 4,229,826 | 10/1980 | Wanzer | 455/83 |
| 4,305,154 | 12/1981 | Deman et al. | 455/83 |
| 4,716,576 | 12/1987 | Sakai et al. | 455/79 X |

FOREIGN PATENT DOCUMENTS

| | | | |
|---|---|---|---|
| 0151014 | 8/1985 | European Pat. Off. | |
| 59-205831 | 11/1984 | Japan | 455/83 |
| 60-261228 | 12/1985 | Japan | 455/83 |
| 61-13718 | 1/1986 | Japan | 455/83 |

OTHER PUBLICATIONS

"Discrete PIN Diodes Toggle UHF Switches"; *Microwaves;* Aug. 1980, Gerald Hiller; pp. 58-60 and 63-65.

Primary Examiner—Robert L. Griffin
Assistant Examiner—Ralph E. Smith
Attorney, Agent, or Firm—Sughrue, Mion, Zinn, Macpeak, and Seas

[57] ABSTRACT

A radio transceiver having a plurality of switching means such that the reception sensitivity and transmission level of the transceiver can be changed. An antenna switching circuit selectively couples the transmitter or receiver to the antenna in response to a transmit or receive mode. A first switch connects the antenna switching circuit to one of a plurality of different potential levels to control the switching of the antenna switching circuit. First and second potential levels are used to achieve first and second receive modes having different receive sensitivities, and a third potential level is used to achieve a transmit mode. A second switch selectively activates one of a first transmitter circuit providing transmission signals, a second transmitter circuit providing reduced transmission signals, and a receiver. A control circuit controls the switching of the first and second switch.

11 Claims, 1 Drawing Sheet

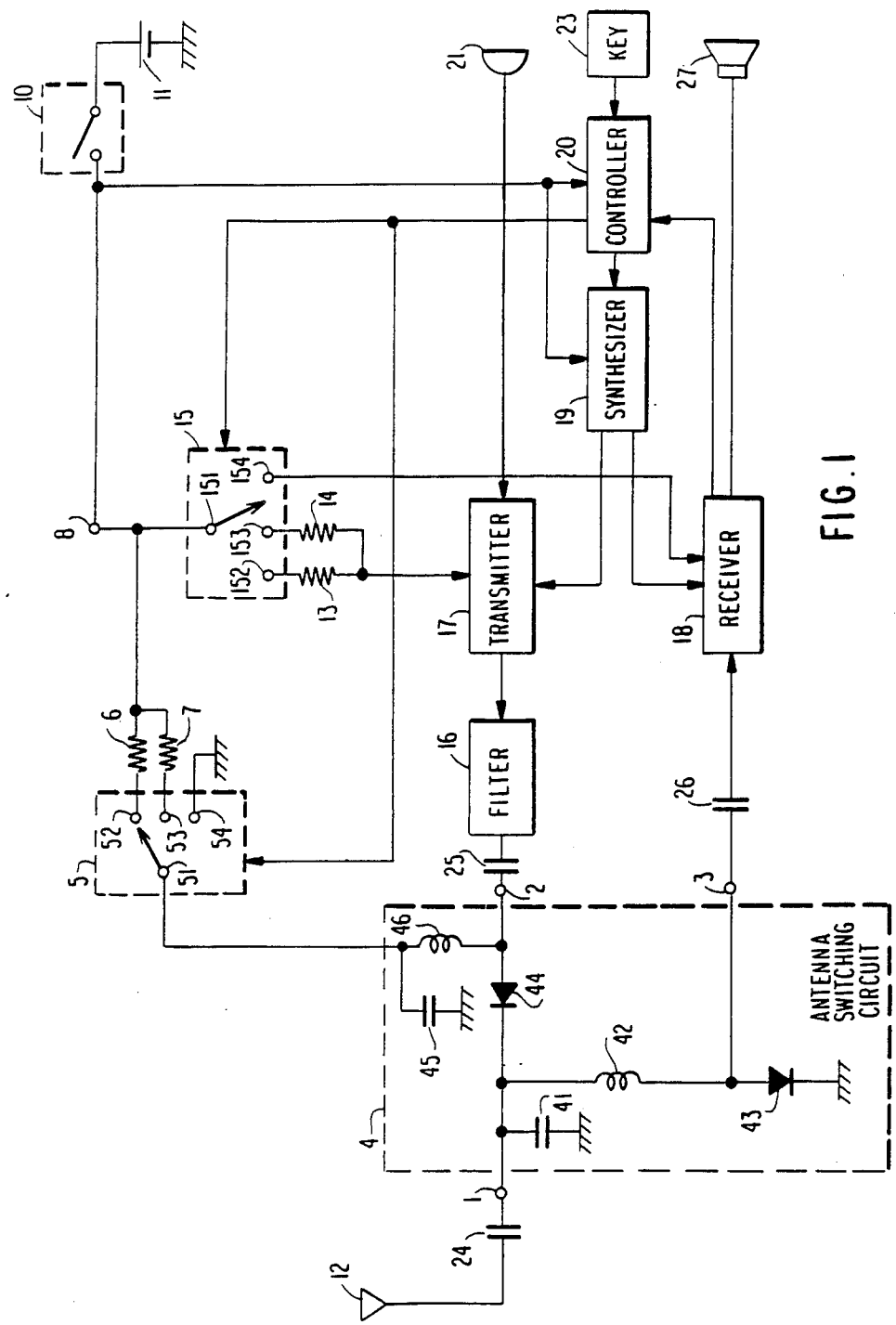
FIG. I

RADIO TRANSCEIVER INCLUDING AN ANTENNA SWITCHING CIRCUIT CAPABLE OF CHANGING RECEPTION SENSITIVITY

BACKGROUND OF THE INVENTION

The present invention relates to a radio transceiver including an antenna switching circuit and, more particularly, to an antenna switching circuit capable of changing reception sensitivity.

In a radio transceiver of the type described, it has been customary to selectively connect a transmitter and a receiver to an antenna by an antenna switching circuit which is responsive to a transmission/receipt control signal and comprised of diodes and others, thereby transmitting or receiving such a radio signal as a frequency modulated signal. Such a transceiver is proposed in the European Patent Publication No. A2-0151014 published in Aug. 7, 1985 and assigned to NEC Corporation.

A prerequisite with a radio transceiver having the above construction is that two remote transceivers, which are in communication, are free from the interference of alien signals. An implementation heretofore adopted to meet such a requisite is varying the gain and, thereby, the reception sensitivity by changing the current value (e.g. emitter current value) of a transistor which is installed in the receiver for high frequency amplification (RF AMP).

However, such a prior art implementation suffers from a drawback that when the current of the transistor for RF AMP is reduced, the transceiver becomes susceptible to mutual interference and, in addition, the decrease in the bias emitter current may deteriorate the temperature characteristic.

SUMMARY OF THE INVENTION

It is therefore an object of the present invention to provide a radio transmitter including an antenna switching circuit which is free from the above-described drawback.

The present invention is applicable to a radio transceiver having an antenna, a transmitter, a receiver and an antenna switching circuit including switching diodes for coupling the transmitter and the receiver to the antenna in response to a transmit mode and a receive mode, respectively. The present transceiver includes means for changing the resistances of the switching diodes in response to another receive mode to reduce the level of a received signal supplied from the antenna to the receiver.

BRIEF DESCRIPTION OF THE DRAWINGS

The above and other objects, features and advantages of the present invention will become more apparent from the following detailed description taken with the accompanying drawing in which:

FIG. 1 is a circuit diagram showing a radio transceiver including an antenna switching circuit in accordance with the present invention.

DETAILED DESCRIPTION OF THE INVENTION

Referring to FIG. 1, when a power switch 10 is closed, DC power voltage is applied from a battery 11 to a synthesizer 19 and a controller 20. The controller 20 in turn delivers a channel designation signal to the synthesizer 19 to set up a transmission/receipt frequency.

In a transmit mode operation, the controller 20 so controls switches 15 and 5 as to route the DC power voltage to a transmitter 17 and an antenna switching circuit 4 and not to a receiver 18. Specifically, during transmission, the switch 5 is controlled to connect terminals 51 and 52 thereof. A resistor 6 has resistance R6 which is smaller than the resistance R7 of a resistor 7 so that, under the above condition, the greatest current flows through diodes 43 and 44 to render them fully conductive. Consequently, an antenna terminal 1 and a transmitter terminal 2 are interconnected while, at the same time, a capacitor 41 and a coil 42 complete a parallel resonance circuit for transmit frequency. Hence, the transmitter terminal 2 and a receiver terminal 3 are brought into an open condition, and so are the antenna terminal 1 and the receiver terminal 3.

In the above condition, voice entered via a microphone 21 is modulated, frequency-converted and amplified by the transmitter 17 and, then, fed to an antenna 12 via a filter 16, a capacitor 25, a diode 44 and a capacitor 24 to be transmitted to a remote transceiver. In the transmit mode, the switch 15 is controlled by the controller 20 to connect its terminal 151 to a terminal 152 or a terminal 153. If the resistance of a resistor 13 is selected to be smaller than that of a resistor 14, the transmission output of the transmitter 17 becomes greater when the terminal 151 is connected to the terminal 152 than when it is connected to the terminal 153.

In a receive mode operation, on the other hand, the controller 20 controls the switch 15 such that the DC power voltage is applied to the receiver 18 and not to the transmitter 17. Namely, it connects the terminal 151 of the switch 15 to a terminal 154. Also controlled by the controller 20, the switch 5 connects its terminal 51 to a terminal 53 or a terminal 54. When the terminals 51 and 53 are interconnected in a first receive mode, the current flowing through the diodes 43 and 44 is smaller than the current which flows in the transmit mode because the resistance 66 is smaller than the resistance R7, as previously stated. As a result, the operating resistance of the diode 43 increases relatively and, hence, the coupling between the antenna terminal 1 and the receiver terminal 3 is intensified in proportion to the operating resistance of the diode 43. It follows that any desired amount of coupling may be set up between the antenna terminal 1 and the receiver terminal 3 by suitably selecting the resistance R7 of the resistor 7. In this instance, the influence of the diode 44 is negligible. This is because, in a receive mode in which the transmitter 17 is OFF, the impedance on the transmitter side as viewed from the terminal 2 side can be increased by adequately selecting the distance of connection (electrical length) from the terminal 2 to the transmitter 17, to such a degree that the influence of the transmitter side is negligible. On the other hand, when the terminals 51 and 54 are connected in a second receive mode, current does not flow through the diodes 43 and 44 to equivalently set up an open condition and, therefore, the amount of coupling between the antenna terminal 1 and the receiver terminal 3 can be made greatest.

It is to be noted that the current changeover by the switch 5 has been shown and described as occurring in three steps, four or more changeover steps may be adopted to change the amount of coupling more minutely.

The control over the switches 5 and 15 is performed as follows.

A signal coming in through the antenna 12 is fed to the receiver 18 via an antenna switching circuit 4. The receiver 18 delivers to the controller 20 a signal which is representative of the intensity of the received signal. When the intensity of the received signal is greater than a predetermined reference level, the controller 20 controls the switch 5 to connect the terminal 51 to the terminal 53 to reduce the above-mentioned amount of coupling and, thereby, the reception sensitivity. In a transmit mode following such a receive mode, the controller 20 may control the switch 15 to connect the terminal 151 to the terminal 153 in order to lower the transmission output level.

In the embodiment shown and described, the reception sensitivity and the transmission output are automatically varied by equivalently approximating the distance between the own station and a remote station based on the intensity of a received signal. In an alternative embodiment, a key board 23, which is connected to the controller 20, may be operated to manually vary the reception sensitivity as well as the transmission output level. Further, an arrangement may be made such that a control signal which comes in over a control channel from a remote transceiver is received by the receiver 18 while, in response to the received control signal information, the controller 20 is operated to control the switches 5 and 15.

In summary, it will be seen that a radio transceiver including an antenna switching circuit of the present invention is capable of surely changing reception sensitivity with a minimum number of structural elements. This unprecedented advantage is derived from means which is capable of varying the current flowing through antenna switching diodes in three or more steps. Specifically, the transceiver with such means changes over two or more current values in a receive mode and, thereby, changes the amount of coupling without resorting to a transistor for RF AMP.

What is claimed is:

1. A radio transceiver comprising an antenna, a transmitter, a receiver, an antenna switching circuit including switching diodes for coupling said transmitter and said receiver to said antenna in response to a transmit mode and a receive mode, respectively, and means for changing the resistances of said switching diodes in response to another receive mode to reduce the level of a received signal supplied from said antenna to said receiver.

2. A radio transceiver comprising an antenna, a transmitter, a receiver and an antenna switching circuit including first and second switching diodes, first means for giving a high resistance to said switching diodes by providing a first bias to said switching diodes in a receive mode to couple said antenna to said receiver, second means for giving a low resistance to said switching diodes by providing a second bias to said switching diodes in a transmit mode to couple said transmitter to said antenna, and third means for giving a resistance lying between said high and low resistances to said diodes by providing a third bias to said switching diode in another receive mode.

3. A radio transceiver as claimed in claim 2, comprising means for selecting one of said first and third means in response to a control signal.

4. A radio transceiver as claimed in claim 3, wherein said control signal comprises a signal representative of the intensity of a radio signal received in one of said receive modes.

5. A radio transceiver as claimed in claim 3, comprising key board means for generating said control signal.

6. A radio transceiver as claimed in claim 2, comprising means for varying the output level of said transmitter in response to a control signal.

7. A radio transceiver as claimed in claim 6, comprising key board means for generating said control signal.

8. A radio receiver as claimed in claim 6, comprising means for selecting one of said first and third means in response to another control signal representative of the intensity of a received radio signal.

9. A radio transceiver including:
   an antenna,
   a transmitter,
   a receiver, and
   an antenna switching circuit for selectively coupling said transmitter and said receiver to said antenna in response to a transmit mode and a receive mode, respectively the antenna switching circuit including:
   a first diode coupled between said antenna and said transmitter,
   a second diode and an inductor connected in series between a point of fixed potential and the junction of said antenna and said first diode, and
   means for coupling said receiver to the junction of said second diode and said inductor, and
   means for changing the resistances of said first and second diodes in response to a control signal to couple said antenna to said transmitter in a transmit mode, to couple said antenna to said receiver in first and second receive modes, a receive signal being supplied from said antenna to said receiver in said first receive mode, and a received signal having a reduced level being supplied to said receiver in said second receive mode.

10. A radio transceiver comprising:
    an antenna;
    a transmitter;
    a receiver;
    an antenna switching circuit for selectively coupling said transmitter and said receiver to said antenna in response to a transmit mode respectively and a receive mode, respectively;
    first switching means for connecting said antenna switching circuit to one of a first, second and third potential, said first potential for causing said antenna switching circuit to selectively couple said antenna to said receiver such that a received signal can be applied to said receiver in a first receive mode, said second potential for causing said antenna switching circuit to selectively couple said antenna to said receiver such that a received signal of reduced level can be applied to said receiver in a second receive mode, and said third potential for causing said antenna switching circuit to selectively couple said antenna to said transceiver in a transmit mode.

11. A radio transceiver as claimed in claim 10, wherein said transmitter produces one of a plurality of transmission signals of a plurality of levels in response to a control signal.

* * * * *

UNITED STATES PATENT AND TRADEMARK OFFICE
CERTIFICATE OF CORRECTION

PATENT NO. : 4,853,972

DATED : August 1, 1989

INVENTOR(S) : Hideki UEDA et al

It is certified that error appears in the above-identified patent and that said Letters Patent is hereby corrected as shown below:

On title page under Foreign Patent Documents, 0151014 the date should be changed to July 8, 1985.

Column 1, line 19, delete "Aug. 7" and insert --July 8--;

Column 2, line 42, delete "resistance 66" and insert --resistance R6--;

Column 4, line 12, delete "receiver" and insert --transceiver;

Column 4, line 36, delete "receiver signal" and insert --received signal--.

Signed and Sealed this

Twenty-third Day of April, 1991

Attest:

HARRY F. MANBECK, JR.

*Attesting Officer*  *Commissioner of Patents and Trademarks*